Dec. 20, 1966 G. W. ERICKSON 3,292,762
SHEET FEED MECHANISM
Filed June 1, 1962 4 Sheets-Sheet 1

INVENTOR.
GEORGE W. ERICKSON
BY
ATTORNEY

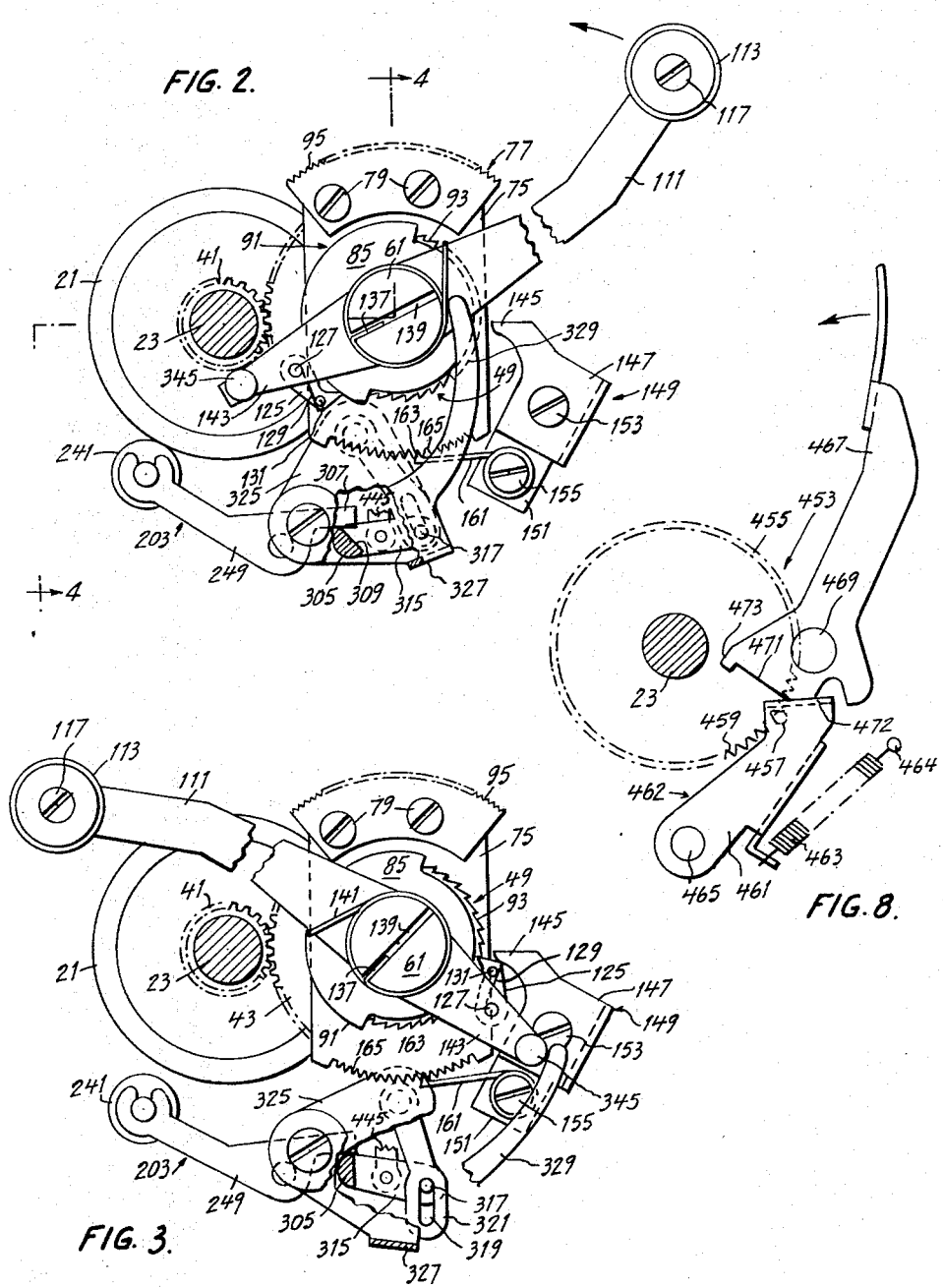

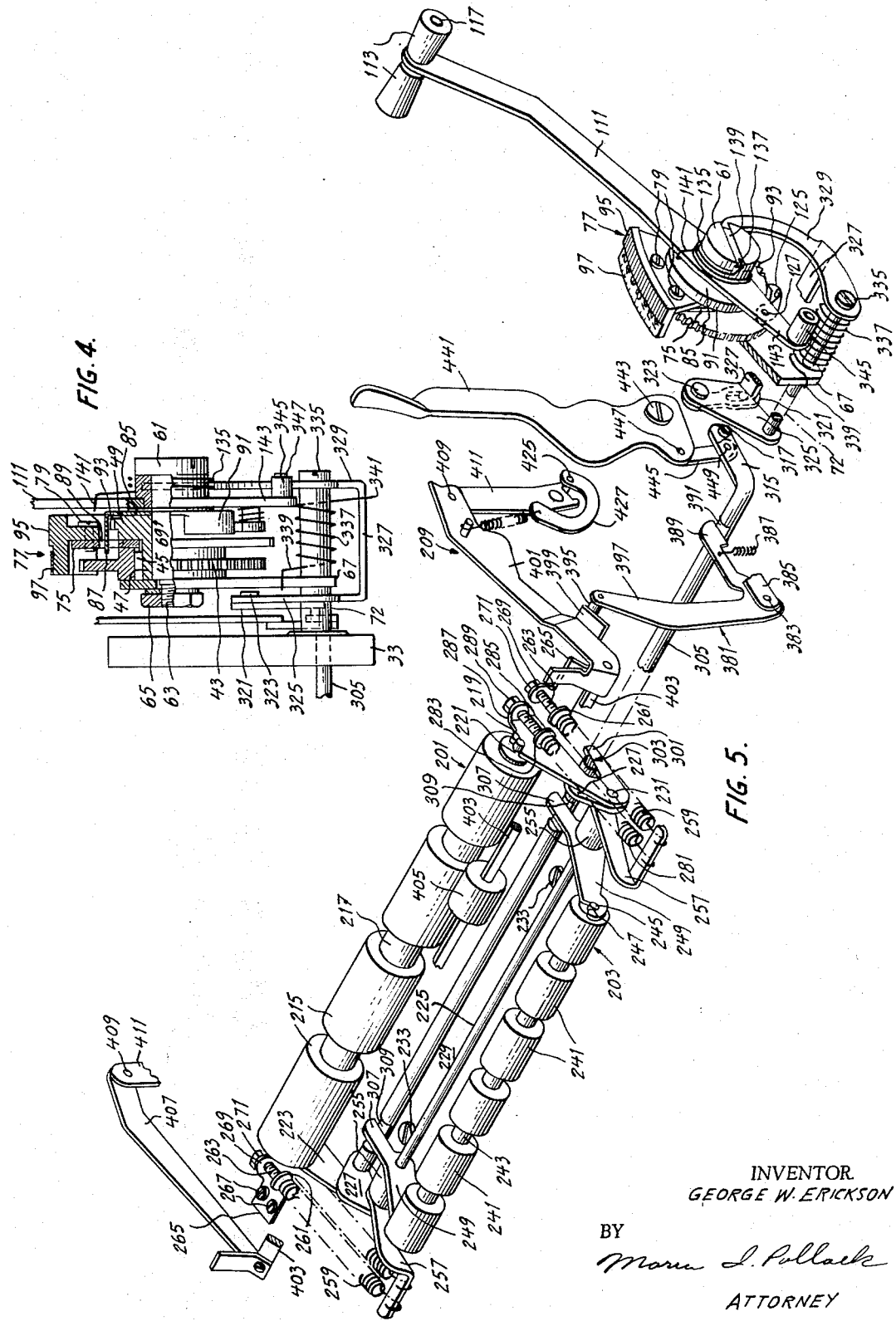

Dec. 20, 1966   G. W. ERICKSON   3,292,762
SHEET FEED MECHANISM

Filed June 1, 1962                      4 Sheets-Sheet 4

INVENTOR.
GEORGE W. ERICKSON
BY
*Morris L. Pollack*
ATTORNEY 3,292,762
SHEET FEED MECHANISM
George W. Erickson, Norwalk, Conn., assignor to Sperry Rand Corporation, New York, N.Y., a corporation of Delaware
Filed June 1, 1962, Ser. No. 199,520
4 Claims. (Cl. 197—114)

This invention relates to sheet feed mechanisms and more particularly to a mechanism for advancing a work sheet or plural work sheets through a work station in successive selective, proportionally spaced increments of movement.

The present invention finds ready application in business machines such as typewriters, calculators, tabulators, etc., wherein a work sheet is advanced through a work station in selective successive steps to allow the business machine to place proportionally spaced lines of markings on the work sheet.

In most business machines, the work sheet is gripped by an advancing means and moved to and through a work station. At the work station successive lines of markings are placed upon the work sheet. The work sheet may either be positioned at the work station alone or it may be the upper sheet of a plurality of work sheets all positioned at the work station to receive their markings simultaneously and in correspondingly similar places. Actuating means are usually provided for selectively operating the advancing means to move the work sheet either one line space or a plurality of line spaces. The advancing means normally arrests movement of the work sheet at locations closely approximating the proper line spacing. However, the accurate proportional line spacing required by sound business practice necessitates the inclusion of a positioning means on the great majority of business machines. The positioning means is adapted to function after operation of the advancing means to move the advancing means and the work sheet the very small distance required to proportionally space the lines of markings on the work sheet. The positioning structure also prevents inadvertent movement of the advancing means and work sheet while the markings are being applied at the work station. The positioning means in performing its function must overcome the tendency of the advancing means and work sheet to remain where positioned when operation of the advancing means ceases. The advancing means in performing its function must overcome the effect of the positioning means to maintain the advancing means and work sheet positioned at the work station. In those business machines where the efficiency of the positioning means has been maximized the advancing means is usually so weakened that the work sheets are incorrectly advanced to the work station and the line spacing is not proportional. Where plural superimposed work sheets are advanced simultaneously some sheets are advanced different distances than other sheets especially when transfer sheets are interleaved with the work sheets, and the markings do not appear in correspondingly similar places on the plural work sheets. In those business machines where the efficiency of the advancing means has been maximized, the function of the positioning means is usually rendered nugatory and the spacing between the lines of markings on the work sheet is not proportional.

A guide means is also provided in most business machines to assist the advancing means in positioning the work sheet at the work station and to guide the work sheet away from the work station along a path which does not interfere with the normal operation of the business machine. The guide means, however, quite often interferes with the advancing leading edge of the work sheet causing the work sheet to snag and be damaged. Many business machines construct the guide means for manual removal and return by the operator but the operator must remember to first remove the guide means at the proper time and then replace the guide means at the proper time.

It is an object of this invention to provide a novel sheet feed mechanism.

Another object is to provide a novel sheet feed mechanism which maximizes the efficiency of both the sheet advancing means and the sheet positioning means.

Another object is to provide a novel sheet guide means for a sheet feed mechanism.

Still another object is to provide a novel work sheet feed mechanism for a business machine.

A still further object is to provide a novel mechanism for advancing and positioning a work sheet or a plurality of superimposed work sheets at a work station of a business machine.

A still further object is to provide a novel feed mechanism for a business machine including an actuating means operable to advance the work sheet to a work station, control operation of a positioning means, and control operation of a guide means.

A still further object is to provide a novel feed mechanism for selectively feeding a work sheet either one or a plurality of line spaces.

The present invention contemplates the provision of an actuating means for operating the advancing means of a business machine to feed a work sheet a selected number of line spaces. The work sheet is fed by the advancing means to a work station. A guide means and a positioning means assists the advancing means to properly place the work sheet in a position to receive markings while at the work station. Operation of the actuating means advances the work sheet, reduces the grip of the advancing means on the work sheet to facilitate operation of the positioning means, and removes the guide means from the path of travel of the leading edge of the work sheet. Release of the actuating means automatically replaces the guide means in proper position for coaction with the work sheet and returns the grip of the advancing means upon the work sheet to its initial amount.

Other objects and advantages of the invention in its details of construction and arrangement of parts will be apparent from a consideration of the following specification with accompanying drawings wherein:

FIG. 2 is a view in end elevation, cut away in part, looking at the right end of the mechanism shown in FIG. 1 and showing the mechanism in unactuated condition;

FIG. 3 is a view in end elevation, similar to FIG. 2 showing the mechanism in actuated condition;

FIG. 4 is a fragmentary front elevational view taken along lines 4—4 of FIG. 2;

FIG. 5 is a perspective view of the sheet feed mechanism with the platen and supports removed to move clearly show the feed mechanism;

FIG. 8 is an approximate vertical section taken along line 8—8 of FIG. 1.

Figure 1:
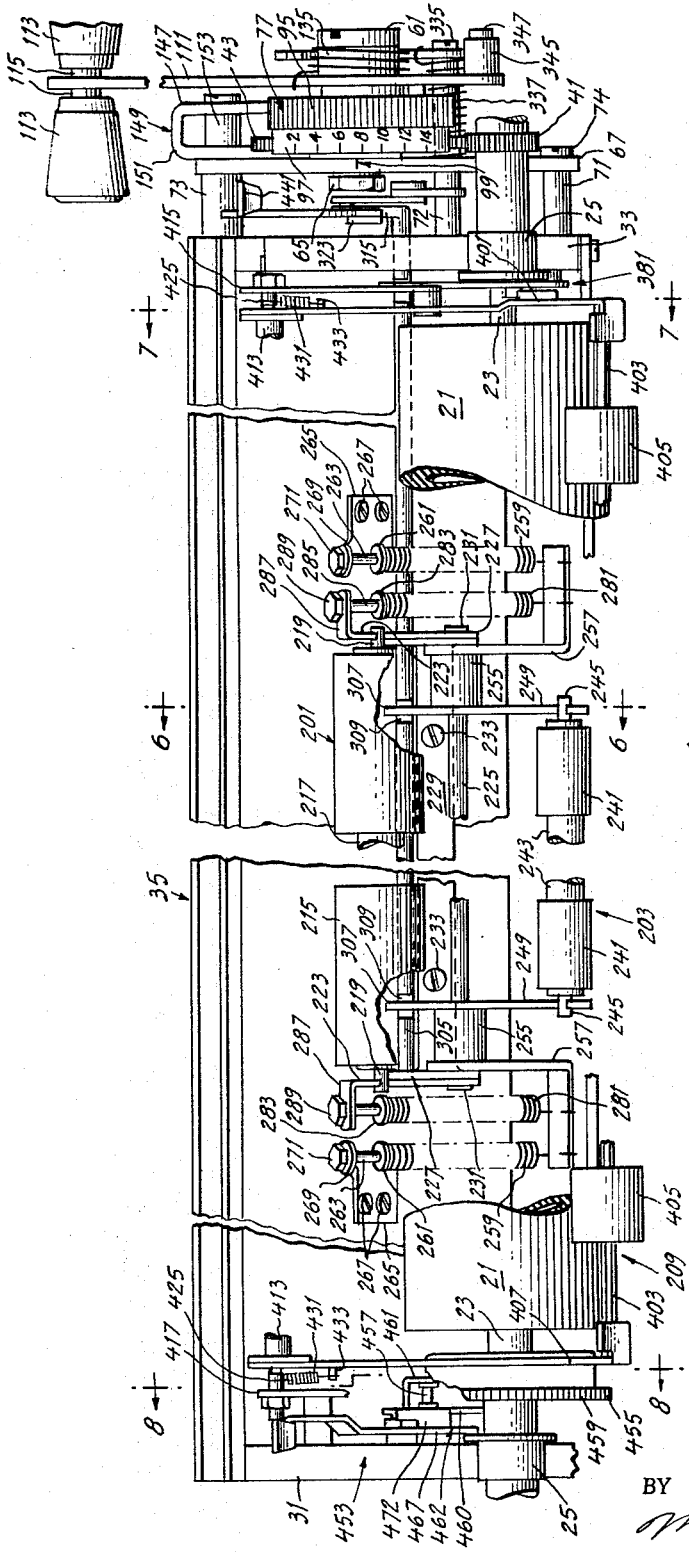
FIG. 1 is a plan view of the sheet feed mechanism which embodies the present invention, with paper pan removed and cut away in part.
Figure 6:
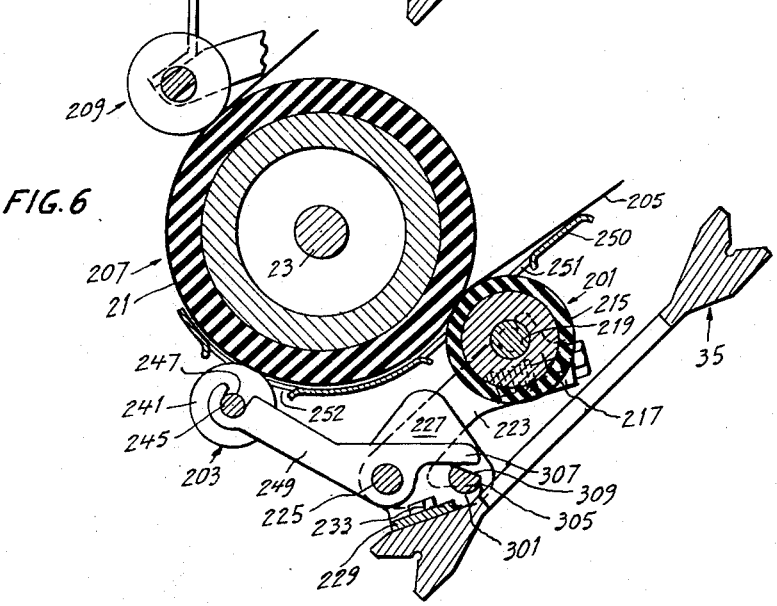
FIG. 6 is a vertical section taken along line 6—6 of FIG. 1 showing the paper pan and a work sheet in place.

Referring to the drawings for a more detailed description of the present invention, an embodiment thereof is shown incorporated in a typewriter having a conventional cylindrical typewriter platen 21 (FIGS. 1 and 2) secured to a platen shaft 23 rotatably mounted in bearings 25 (FIG. 1) in a left end support 31 and a right end support 33 of a movable typewriter carriage 35 (FIGS. 1 and 6). It should be understood however, that the hereinafter described application of the invention to a typewriter is for purposes of illustration only inasmuch as the subject invention finds ready application in any device wherein a work sheet is moved to and through a marking station in selected increments of movement.

A platen shaft gear 41 (FIGS. 1 and 3) is secured to the right end of platen shaft 23. A platen shaft drive gear 43 (FIGS. 3 and 4) enmeshed with platen shaft gear 41 is secured by a pin 45 (FIG. 4) to a hub 47 of an inject control gear 49 for conjoint rotation therewith. A mounting stud 61 (FIGS. 1 and 4) having a threaded end 63 (FIG. 4) secured by a nut 65 to a mounting plate 67, has a smooth surfaced portion 69 (FIG. 4) upon which hub 47 of inject control gear is rotatably carried.

Internally threaded studs 71, 72, 73 (FIG. 1) secured to right end support 33 of carriage 35 serve to position mounting plate 67 thereon. A threaded member 74 is passed through an aperture (not shown) in mounting plate 67 and threaded into stud 71 to partially secure mounting plate 67 in place. Additional threaded members hereinafter described serve the dual function of mounting components on mounting plate 67 as well as securing mounting plate 67 in place on right end support 33 of carriage 35. A selection control plate 75 (FIGS. 3 and 4) rotatably carried by hub 47 of inject control gear 49, has an index member 77 (FIGS. 1 and 5) attached thereto by means of threaded members 79 (FIG. 5).

A selection control cam 85 (FIGS. 3 and 5) rotatably carried on the smooth surfaced portion 69 of mounting stud 61 has a projection 87 (FIG. 4) extending into an aperture 89 on selection control plate 75. A cam shoulder 91 (FIGS. 3 and 4) projects from the selection control cam 85 and partially covers the teeth 93 on inject control gear 49. Knurling 95 (FIGS. 1 and 5) is provided on the upper surface of index member 77 to facilitate rotational movement of index member 77, attached selection control plate 75, and selection control cam 85 about hub 47 and portion 69 of studs 61, respectively. Indicia 97 (FIGS. 1 and 5) also carried on the upper surface of index member 77 cooperate with a reference mark 99 (FIG. 1) carried by mounting plate 67 to indicate the position of selection control cam 85.

An inject lever 111 (FIGS. 1 and 5) is also rotatably carried on the smooth surfaced portion 69 of mounting stud 61. Two knobs 113 are rotatably carried on a fixed shaft 115 mounted in the upper extremity of inject lever 111. Screws 117 (FIG. 2) are threaded into each end of shaft 115 to maintain knobs 113 in place.

An inject pawl 125 (FIGS. 3 and 5) is pivotally carried by a pin 127 secured to inject lever 111. A spring 129 (FIG. 2) has one end thereof wrapped around pin 127 and the other end in engagement with a pin 131 on inject pawl 125. Spring 129 biases the inject pawl 125 in a counterclockwise direction (FIG. 2) against either the cam shoulder 91 of selection control cam 85 (FIG. 2) or teeth of inject control gear 49 (FIG. 3).

A torsion spring 135 (FIGS. 1 and 5) is wound around mounting stud 61 and has a first end 137 lodged in a groove 139 formed in mounting stud 61. The other end 141 of torsion spring 135 is hooked over inject lever 111 and urges inject lever 111 in a clockwise direction (FIG. 3). The lower end 143 (FIG. 2) of inject lever 111 is adapted to abut against platen shaft 23 to limit clockwise rotation (FIG. 2) of inject lever 111.

The extent of counterclockwise rotational movement (FIG. 3) of inject lever 111 is determined by a stop 145 (FIG. 3) which arrests movement of inject pawl 125 and thereby inject lever 111. Stop 145 is formed as a projection of a right leg 147 (FIG. 1) of U shaped member 149. A left leg 151 of U shaped member 149 abuts mounting plate 67. A stud 153 (FIGS. 1 and 2) extends through an appropriate aperture (not shown) in mounting plate 67 and has a threaded end (not shown) threaded into internally threaded stud 73 on right end support 33 of carriage 35, to attach the mounting plate 67 thereto.

A threaded member 155 (FIG. 2) serves to additionally secure the U shaped member 149 in place on mounting plate 67 as well as to mount a detent spring 161 having an end 163 which seats in any one of plural teeth 165 formed in selection control plate 75 (FIGS. 2 and 3).

Considering now the operation of the structure described up to this point, if it is desired to rotate platen 21 the operator grasps knobs 113 of inject lever 111 and rotates inject lever 111 from its unactuated position (FIG. 2) counterclockwise to its fully actuated position (FIG. 3). As inject lever 111 rotates counterclockwise inject pawl 125, pivotally mounted on pin 127 secured to inject lever 111, under bias of spring 129 rides along cam shoulder 91 of selection control cam 85 and then seats between two teeth 93 of inject control gear or ratchet 49 to effect conjoint rotation of inject control gear 49 with inject lever 111. Rotation of inject control ratchet 49 through pin 45 (FIG. 4) drives platen shaft drive gear 43 (FIG. 3) platen shaft gear 41 enmeshed therewith, platen shaft 23 and platen 21. Continued counterclockwise rotation of inject lever 111 is arrested when inject pawl 125 abuts against stop 145 of U shaped member 149.

From the above description and an inspection of FIGS. 2 and 3 it will be apparent that the throw of inject lever 111 is always the same because the distance from its unactuated position (FIG. 2) to its fully actuated position (FIG. 3) is a constant. The manner of varying the amount of rotation of platen 21 is therefore dependent upon the distance through which inject lever 111 and inject control gear 49 rotate concurrently. Conjoint rotation of both inject lever 111 and inject control gear 49 depends upon the position of selection control cam 85 which determines the amount of cam shoulder 91 inject pawl 125 travels along before seating between two teeth 93 of inject control gear 49.

To change the position of selection control cam 85, the operator grasps the knurling 95 of index member 77 and moves the index member 77 either clockwise or counterclockwise (FIG. 2) to align a selected indicia 97 with reference mark 99 on mounting plate 67. Movement of index member 77 will effect conjoint movement of selection control plate 75. As selection control plate 75 moves, the wall of aperture 89 (FIG. 4) formed therein engages projection 87 of selection control cam 85 to effect conjoint movement thereof. Rotation of selection control cam 85 clockwise (FIG. 2) reduces the amount of cam shoulder 91 inject pawl 125 travels along to increase the distance through which inject lever 111 and inject control gear 49 move conjointly and thereby increase the amount of rotation of platen 21. Rotation of selection control cam 85 counterclockwise (FIG. 2) will, increase the amount of cam shoulder 91 inject pawl 125 travels along to reduce the distance through which inject lever 111 and inject control gear 49 move conjointly and thereby decrease the amount of rotation of platen 21. The end 163 of detent spring 161 seats in detent teeth 165 of selection control plate 75 to prevent inadvertent movement of selection control plate 75 and index member 77 from the selected position. The indicia 97 formed upon index member 77 are indicative of the number of line spaces between the top of the work sheet and the first line of which markings will be placed thereon or between successive lines at which markings are to be placed on the work sheet.

The rotating platen 21 coacts with a rear feed roll assembly 201 (FIGS. 1 and 6) and a front feed roll assembly 203 to feed a work sheet or a plurality of work sheets 205 (FIG. 6) to and through a marking station 207. Marking station 207 is located approximately half way between front feed roll assembly 203 and a guide or paper bail assembly 209 (FIGS. 1 and 7) and constitutes that area of the mechanism where the marking means (not shown) applies markings to work sheet 205. The marking means may be any type of conventional well known marking means such as type bars if printing is desired, punches if perforations are desired, a magnetic recording head if it is desired to place magnetic marks on work sheet 205, or the like. Guide assembly 209, rear feed roll assembly 201, and front feed roll assembly 203 coact to position work sheet 205 at marking station 207 to receive a line of characters thereon printed through the action of conventional typewriting structure (not shown).

Rear feed rolls 215 (FIGS. 1 and 5) of rear feed roll assembly 201 are secured to a hollow shaft 217 (FIG. 6) rotatably carried by a rear feed roll shaft 219 seated in recesses 221 (FIG. 5) formed in rear feed roll support arms 223. A pivot shaft 225 secured between two upstanding ears 227 (FIGS. 1, 5 and 6) of a feed roll support 229 has two ends 231 (FIG. 1) extending beyond upstanding ears 227 and upon which feed rolls support arms 223 are pivotally mounted. Threaded members 233 (FIGS. 1 and 6) secure feed roll support 229 to typewriter carriage 35.

Front feed rolls 241 (FIGS. 1 and 6) of front feed roll assembly 203, are secured to a hollow shaft 243 rotatably carried by a front feed roll shaft 245 seated in recesses 247 (FIG. 6) formed in front feed roll support arms 249 pivotally mounted on pivot shaft 225.

A paper pan 250 (FIG. 6) of well known construction, is mounted on carriage 35 between the platen 21 and rear and front feed roll assemblies 201 and 203 respectively. Apertures 251 and 252 are formed in paper pan 250 to allow the surfaces of rear feed rolls 215 and front feed rolls 241 to project through paper pan 250 and into engagement with the surface of platen 21.

A tubular extension 255 (FIG. 1) is secured to each front feed roll support arm 249 and has a biasing ear 257 attached thereto. A front feed roll biasing spring 259 is provided at each end of the feed roll assemblies 201 and 203 with a first end of each biasing spring 259 being hooked over its respective biasing ear 257. The other end of each biasing spring 259 terminates in a tapped plate 261 through which an adjusting screw 263 is threaded. An adjusting screw mounting bracket 265, attached to carriage 35 by threaded members 267 has a projecting ear 269 which serves as a fixed stop for a head 271 formed on each adjusting screw 263.

A rear feed roll biasing spring 281 is also provided at each end of the feed roll assemblies 201 and 203 (FIGS. 1 and 5) with a first end of each biasing spring 281 being hooked over its respective biasing ear 257. The other end of each biasing spring 281 terminates in a tapped plate 283 through which an adjusting screw 285 is threaded. An ear 287 provided on each rear feed roll support arm 223 serves as a fixed stop for a head 289 formed on each adjusting screw 285.

The adjustment screws 285 for the rear feed roll assembly 201 have been set so that the springs 281 thereof will act on ears 287 (FIG. 1) of rear feed roll support arms 223 and rotate the arms 223 counterclockwise (FIG. 6) about pivot shaft 225 to urge the rear feed rolls 215 into engagement with platen 21 with a first predetermined amount of pressure. The adjustment screws 263 for the front feed roll assembly 203 have been set so that the springs 259 thereof will act on ears 257 of front feed roll support arms 249 and rotate the arms 249 clockwise (FIG. 6) about pivot shaft 225 to urge the front feed rolls 241 into engagement with platen 21 with a second predetermined amount of pressure. The second predetermined amount of pressure (with which the front feed rolls 241 engage platen 21) is less than the first predetermined amount of pressure (with which the rear feed rolls 215 engage platen 21).

A release ear 301 (FIGS. 5 and 6) formed on each rear fed roll support arm 223, is biased by rear feed roll biasing spring 281 into engagement with a rear feed roll cam flat 303 (FIG. 5) formed in the underside of a feed roll release shaft 305. Feed roll release shaft 305 is rotatably supported in upstanding ears 227 (FIGS. 1 and 5) of feed roll support 229 and right end support 33 (FIGS. 1 and 4) of typewriter carriage 35.

A release ear 307 (FIG. 6), formed on each front feed roll support arm 249, is biased by front feed roll biasing spring 259 into engagement with a front feed roll cam flat 309 (FIGS. 1 and 5) formed on the upper side of feed roll release shaft 305.

A rearwardly extending arm 315 (FIGS. 3 and 5) formed on the right end of feed roll release shaft 305, has secured thereto a pin 317 adapted to slide in an elongated slot 319 formed in a link 321. A pivot pin 323 interconnects link 321 with a plate 325 rotatably carried on stud 72 secured to right end support 33 of carriage 35 (FIG. 4). An extension 327 extends to the right (FIG. 4) of plate 325 and interconnects plate 325 with a release cam 329. A stud 335 threaded into internally threaded stud 72 pivotally mounts release cam 329 on mounting plate 67. A torsion spring 337 (FIGS. 4 and 5) is wound around stud 335 and has one end thereof 339 (FIG. 4) hooked around mounting plate 67 and the other end 341 (FIG. 4) in engagement with extension 327. The tension spring 337 biases the release cam 329 and plate 325 in the counterclockwise direction (FIGS. 2 and 5) until the lower end of elongated slot 319 of link 321 abuts against pin 317 of rearward extension 315 of feed roll release shaft 305. A roller 345 adapted to coact with release cam 329 (FIG. 1) is rotatably carried on the lower end 143 of inject lever 111 by a mounting stud 347.

A guide assembly control arm 381 (FIGS. 5 and 7) is pivotally connected by a pin 383 to a bracket 385 carried by the carriage 35. A spring 387 biases guide assembly control arm 381 in the clockwise direction (FIG. 7) and maintains a lower leg 389 thereof in engagement with a cam flat 391 on feed roll release shaft 305. A lug 395 (FIG. 5) secured to an upper leg 397 of guide assembly control arm 381 coacts with an ear 399 formed on a right side pivot arm 401 of guide assembly 209. A guide or paper bail shaft 403 (FIGS. 1 and 5) rotatably carrying guide or paper bail rollers 405 interconnects the right side pivot arm 401 to a left side pivot arm 407. Pins 409 (FIG. 5) pivotally connect right side pivot arm 401 and left side pivot arm 407 to support arms 411 rotatably carried by a shaft 413 (FIG. 1) journalled respectively in an end plate 415 secured to carriage 35 at the right side thereof and an end plate 417 secured to left end support 31 of carriage 35.

Two notches 421 and 423 (FIG. 7) formed in the end of each support arm 411 alternately coact with a pin 425 projecting inwardly from each end plate 415, 417. A C shaped member 427 is positioned adjacent each support arm 411. One end of each C shaped member 427 is rotatably carried by the pin 425 while the other end of each C shaped member 427 has formed therein an aperture 429. Springs 431 (FIGS. 1 and 7) have one end thereof hooked in each aperture 429 and the other end thereof attached to a pin 433 secured to side arms 401 and 407 respectively.

Figure 7:
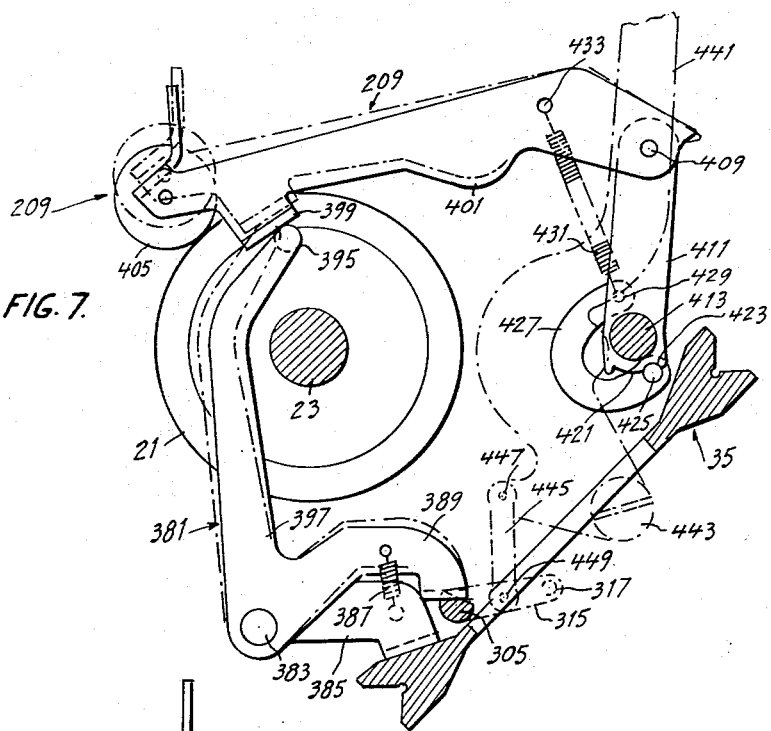
FIG. 7 is a vertical section taken along line 7—7 of FIG. 1 with the sheet feed mechanism removed to better show the guide assembly.

The springs 431 are mounted so as to make the side arms 401 and 407 coact with their support arms 411 in a manner similar to that of over center toggles. The springs 431 normally bias side arms 401 and 407 in a counterclockwise direction (FIG. 7). Manual movement of guide shaft 403 will rotate the guide assembly 209 about pins 425. The notches 421, 423 coacting with pins 425 determines the extent of movement of support arms 411. Continued movement of guide shaft 403 will cause the pins 409 to assume a position along a center line passing through pins 425 and 433 at which point springs 431 will bias the side arms 401, 407 in a clockwise direction (FIG. 7) about pins 425. Since these various positions of guide assembly 209 form no part of subject disclosure further description there of is not considered to be necessary. It is sufficient to point out that the springs 431 will normally bias the side arms 401, 407 and guide or paper bail shaft 403 counterclockwise (FIG. 7) about pins 425 and maintain guide rollers 405 in engagement with platen 21 with a predetermined amount of pressure and along a line which will bring the guide rollers 405 into contact with that portion of work sheet 205 that has passed through marking station 207.

A release lever 441 (FIG. 5) is pivotally mounted on right end support 33 of carriage 35 by a pivot member 443. A toggle link 445 is pivotally interconnected with both feed roller release lever 441 and rearwardly extending arm 315 of feed roll release shaft 305 by pivot pins 447, 449.

A platen shaft positioning means 453 (FIGS. 1 and 8) is positioned near the left end of carriage 35. A platen shaft detent gear 455 is secured to platen shaft 23 near the left end thereof. A detent pin 457, adapted to coact with teeth 459 of detent gear 455 is mounted between the side walls 460, 461 of a detent carrier 462. A spring 463 having one end thereof attached to pin 464 projecting from left end support 31 of carriage 35 rotates detent carrier 462 counterclockwise (FIG. 8) about a pivot pin 465 also secured to left end support 31 of carriage 35 and seats the detent pin 457 between two teeth 459 of detent gear 455. A detent release lever 467 pivotally mounted on a pin 469 secured to left end support 31 of carriage 35 has a cam portion 471 coacting with a ledge 472 on wall 460 of detent carrier 462. A lip 473 projecting from detent release lever 467 is adapted to abut against the ledge 472 to limit counterclockwise rotation (FIG. 8) of detent release lever 467.

Coming now to the operation of the structure described, if it is desired to insert a work sheet or a plurality of work sheets 205 (FIG. 6) into the mechanism for subsequent feed to making station 207, the operator positions work sheet 205 behind the back of platen 31. Paper pan 250 will guide work sheet 205 until the leading edge thereof engages the tangent meeting surfaces of platen 21 and rear feed rolls 215.

Once work sheet 205 is properly positioned operation of the advancing means will feed it to the marking station. The advancing means comprises inject lever 111 and associated structure for rotating platen 21 as well as rear feed roll assembly 201 and front feed roll assembly 203.

Operation of inject lever 111 (as previously explained) will effect rotation of platen 21 through the intermediary of inject pawl 125 (FIGS. 2 and 3), inject control gear 49, pin 45 (FIG. 4), platen shaft drive gear 43, platen shaft gear 41 and platen shaft 23.

Rotating platen 21 grips work sheet 205 between its surface and the surface of rear feed rolls 215 and the traction established therebetween by springs 281 will effect concurrent movement of platen 21, work sheet 205 and rear feed rolls 215. As the leading edge of work sheet 205 passes between platen 21 and rear feed rolls 215 it will strike and be guided by paper pan 250 until the leading edge of work sheet 205 engages the tangent meeting surfaces of platen 21 and front feed rolls 241. Work sheet 205 is thereafter gripped between platen 21 and front feed rolls 241 and the traction established therebetween by springs 259 will effect concurrent movement of platen 21, work sheet 205, and front feed rolls 241.

Simultaneously with the drive of platen 21 the movement of inject lever 111 from its unactuated position (FIG. 2) to its actuated position (FIG. 3) brings roller 345 carried by mounting stud 347 on lower end 143 of inject lever 111, into engagement with release cam 329. Continued movement of roller 345 along the surface of release cam 329 pivots the release cam 329 clockwise (FIGS. 2 and 3) about stud 335 and against the action of torsion spring 337. Movement of release cam 329 results in a concurrent movement of extension 327 which pivots plate 325 clockwise (FIGS. 2 and 3) about stud 72. As plate 325 moves clockwise (FIGS. 2 and 3) pin 323 thereon will cause link 321 to move downwardly (FIGS. 2 and 3). In the unactuated condition (FIG. 2) link 321 is positioned so that pin 317 abuts the lower inner surface of slot 319 in link 321. As link 321 moves downwardly the upper inner surface of slot 319 approaches and then engages pin 317. Further movement of link 321 downwardly also moves pin 317 which in turn will rotate rearward extending arm 315 of feed roll release shaft 305 clockwise (FIGS. 2 and 3) about the axis of feed roll release shaft 305.

As feed roll release shaft 305 rotates clockwise cam flats 303 formed thereon coact with release ears 301 of rear feed roll support arms 223 to rotate the arms 223 and rear feed rolls 215 clockwise about pivot shaft 225 against the bias of rear feed roll biasing springs 281. This coaction between the cam flat 303 and release ear 301 is such that the first predetermined amount of pressure (with which the rear feed rolls 215 engage platen 21) is reduced.

Concurrently with the reduction in pressure by rear feed rolls 215 on platen 21 cam flats 309 (FIG. 2) on feed roll release shaft 305 coact with release ears 307 of front feed roll support arms 249 to rotate the front feed roll support arms 249 counterclockwise against their springs 259 and about pivot shaft 225 and move the front feed rolls 241 from a position of engagement with platen 21 (FIG. 2) to a position removed from platen 21 (FIG. 3).

Concurrently with the movement of rear feed rolls 215 and front feed rolls 241, under action of feed roll release shaft 305, cam flat 391 formed on feed roll release shaft 305 effect counterclockwise rotation (FIG. 7) of guide assembly control arm 381 about its pivot pin 383 and against the action of spring 387. Lug 395 carried by leg 397 of guide assembly control arm 381 coacts with cam 399 formed on right side arm 401 to pivot the pivot arms 401, 407 guide shaft 403 and support arms 411 clockwise about shaft 413. Clockwise movement of guide shaft 304 moves guide rollers 450 from a position of engagement with platen 21 (solid lines FIG. 7) to a position removed from platen 21 (broken lines FIG. 7).

The cam slot 319 formed in link 321 allows for lost motion of the feed roll release shaft 305. The mechanism is constructed so that, just prior to the leading edge of work sheet 205 engaging the tangent meeting surfaces formed by guide roller 405 and platen 21, feed roll release shaft 305: (1) reduces the pressure of rear feed rolls 215 upon the work sheet 205 and platen 21; (2) removes front feed rolls 241 from their position of engagement with work sheet 205 and platen 21 and; (3) removes guide rollers 405 from their position of engagement with platen 21.

The movement of guide rollers 405 away from platen 21 allows the leading edge of work sheet 205 to pass therebetween without being wrinkled or otherwise damaged.

The action of feed roll release shaft 305 will maintain front feed rolls 241 and guide or paper bail rollers 405 removed from plate 21 for the remaining portion of the movement of inject lever 111 and until inject pawl 125 abuts against stop 145. The reduced pressure between rear feed rolls 215 and platen 21 is such that it occurs prior to termination of the advancing movement and will be sufficient to move work sheet 205 the full selected increment of movement.

Detent 457 (FIG. 8) under bias of spring 463 is adapted to seat between two adjacent teeth 459 on platen shaft detent gear 455 to insure a proportional positioning of platen 21 and thereby a proportional movement of work sheet 205. The spring 463 must provide sufficient pressure to properly seat detent 457, which seating action may necessitate rotational movement of platen shaft 23 with a corresponding feed of work sheet 205.

If spring 463 is too weak it will be ineffectual to proportionally position platen 21, if it is too strong it will prevent rotation of gear 455 and thereby platen shaft 23. If the feed rolls 215 and 241 and guide rollers 405 were allowed to remain in engagement with work sheet 205 at the completion of incremental movement thereof the effect of the bias of the feed rolls 215, 241 and guide rollers 405 by their respective springs upon the work sheet 205 and platen 21 would be to prevent any additional movement thereof. However such additional movement may be required to assure proper spacing. By maintaining front feed rolls 241 and guide rollers 405 removed from work sheet 205 and platen 21 and by reducing the amount of pressure between rear feed rolls 215 and platen 21 a spring 463 of proper characteristics may be utilized to seat detent 457 and proportionally space work sheet 205.

Release of inject lever 111 will allow spring 135 to return inject lever 111 to its unactuated condition. Spring 345 will return release cam 329 to its unactuated condition and feed roll release shaft 305 to its unactuated condition. Spring 387 will move guide assembly control arm 381 and allow resetting of guide rollers 405 against work sheet 205 and platen 21. Springs 259 and 281 will reapply the pressure by front and rear feed rolls 241 and 215 respectively against work sheet 205 and platen 21.

Subsequent operation of inject lever 111 moves work sheet 205 through marking station 207 and through coaction with release shaft 305 allow proper seating of detent 457 and proportional spacing of the lines of print.

When initially feeding a work sheet or plurality of work sheets 205 into the typewriter the operator may prefer to utilize feed roll release lever 441. Counterclockwise rotation of feed roll release lever 441 about pivot pin 443 (FIG. 7) moves toggle link 445 downwardly to rotate rearward extending arm 315 and feed roll release shaft 305. Feed roll release shaft 305 rotates a slightly greater distance through the action of feed roll release lever 441 then through the action of inject lever 111. The additional increment of rotation of feed roll release shaft 305 causes both front feed rolls 241 and rear feed rolls 215 to move away from the surface of platen 21. The movement of feed rolls 241 and 215 away from platen 21 allows for a rapid insertion or removal of a work sheet 205. Return clockwise of feed roll release lever 441 to its unactuated condition allows normal operation of inject lever 111.

Release of detent 457 from engagement with platen shaft detent gear 455 is accomplished by moving detent release lever 467 counterclockwise (FIG. 8) so that its cam 471 coacts with ledge 472 on detent carrier 461 to rotate detent carrier 461 clockwise and move detent 457 away from teeth 459 of gear 455. Release of lever 467 allows spring 463 to reset detent carrier 461 and return detent release lever 467 to its unactuated position.

It is understood that although I have shown the preferred form of my invention that various modifications may be made in the details thereof without departing from its spirit as comprehended by the following claims.

What is claimed is:

1. In a typewriter or the like machine including means for marking such as by printing on a work sheet, a mechanism for work sheet injecting and positioning with respect to a marking station, comprising:
    (a) a support,
    (b) a cylindrical platen rotatably journalled on said support,
    (c) a first feed roller,
    (d) first mounting means carried on said support for first feed roller support and rotation,
    (e) first biasing means coacting with said first mounting means to urge said first roller and said platen together for engagement with a first predetermined pressure for gripping and advancing said work sheet,
    (f) a second feed roller,
    (g) second mounting means carried on said support for second feed roller support and rotation,
    (h) second biasing means coacting with said second mounting means to urge said second roller and said platen together for engagement with a second predetermined pressure different from said first predetermined pressure for gripping and advancing said work sheet,
    (i) a guide roller,
    (j) bail means carried by said support and mounting said guide roller for rotation,
    (k) guide roller biasing means mounted on said support and said bail means to urge said guide roller and platen together for engagement guiding said sheet beyond said station,
    (l) detent means carried by said support and said platen to operatively connect with said platen yieldably stopping it after uniform increments of movement to locate said work sheet with respect to said station,
    (m) actuating means carried by said support and coacting with said rollers and said platen to advance said work sheet through said marking station in selected successive increments of advance movement and hold said sheet against said platen at the termination of said movement,
    (n) control means interconnecting said actuating means, said roller mounting means and said bail means, said control means being operable by said actuating means just prior to engagement of said sheet by said guide roller to reduce said first predetermined pressure to a lesser pressure and to simultaneously separate said second feed roller and said guide roller from engagement with said platen and sheet, and
    (o) return means operable upon termination of said movement to reset said actuating means, said rollers and said control means wherein said rollers are in said engagement and said predetermined pressures are reapplied on a fully injected work sheet.

2. In a typewriter or the like machine, a mechanism for work sheet injecting and positioning with respect to a marking station, said mechanism comprising:
    (a) work sheet advancing means adapted to normally grip a work sheet with a predetermined pressure and advance the work sheet to and through said marking station in a selected number of successive increments of movement; said advancing means including a platen, feed roller means, and biasing means urging said platen and feed roller means together with said pressure;
    (b) work sheet positioning means coacting with said work sheet advancing means at about the termination of said movement to yieldably stop said advancing means and locate said work sheet proportionally with respect to substantial uniformity of said increments included in said movement and with respect to said marking station, said positioning means including detent means biased to operatively connect with said platen for so locating said sheet;
    (c) actuating means for operating said work sheet advancing means and said positioning means to inject and feed the work sheet to and through said marking station in said selected number of increments of movement;
    (d) control means coacting with said advancing means and said actuating means during operation thereof to reduce said predetermined pressure to a lesser pressure on the work sheet just prior to and at termination of said movement; while keeping at least a part of said feed roller means gripping said sheet; and (e) return means operable after termination of said movement to reset said actuating means and advancing means for subsequent operation of said actuating means and reapplication of said predetermined amount of pressure.

3. The mechanism of claim 2 wherein said advancing means comprises a plurality of feed roller means circumferentially spaced from each other about said platen, said control means having cam means operative to reduce said predetermined pressure to said lesser pressure at the first of said feed roller means to grip said sheet and to separate the rest of said feed roller means from said sheet and platen just prior to and at termination of said movement.

4. The mechanism of claim 3 including work sheet guide means having bail rolls adapted to cooperate with said platen and engage said work sheet after passage through said marking station to maintain said work sheet beyond said station between said bail rolls and said platen; said control means coacting for concurrently reducing said predetermined pressure and separating said rest of said feed roller means just prior to said sheet becoming engageable by said guide means; said control means coacting concurrently to separate said guide means from said platen; said return means being operable upon termination of said movement to position said guide means into engagement with said sheet against said platen.

References Cited by the Examiner

UNITED STATES PATENTS

| | | | |
|---|---|---|---|
| 1,121,031 | 12/1914 | Peterman | 197—114 |
| 1,270,292 | 6/1918 | Hess | 197—138.5 |
| 1,785,445 | 12/1930 | Handley | 197—114 X |
| 1,910,329 | 5/1933 | Going | 197—138 |
| 1,955,578 | 4/1934 | Crumrine | 197—138 |
| 2,021,195 | 11/1935 | Mulhare | 197—114 |
| 2,209,222 | 7/1940 | Dobson | 197—114 |
| 2,311,227 | 2/1943 | Handley et al. | 197—138 |
| 2,713,932 | 7/1955 | Letterman | 197—138.5 |
| 2,767,821 | 10/1956 | Girouard et al. | 197—138 |

FOREIGN PATENTS 338,382  11/1930  Great Britain.

ROBERT E. PULFREY, *Primary Examiner.*

E. WRIGHT, *Assistant Examiner.*